United States Patent
Thiagrajan et al.

(10) Patent No.: US 11,397,919 B1
(45) Date of Patent: Jul. 26, 2022

(54) ELECTRONIC AGREEMENT DATA MANAGEMENT ARCHITECTURE WITH BLOCKCHAIN DISTRIBUTED LEDGER

(71) Applicant: EMC IP Holding Company LLC, Hopkinton, MA (US)

(72) Inventors: Senthil Thiagrajan, Westborough, MA (US); Sudhir Vijendra, Westborough, MA (US); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 467 days.

(21) Appl. No.: 15/800,897

(22) Filed: Nov. 1, 2017

(51) Int. Cl.
 *G06Q 10/10* (2012.01)
 *G06F 21/10* (2013.01)
 *H04L 67/10* (2022.01)
 *H04L 67/02* (2022.01)
 *G06F 9/54* (2006.01)

(52) U.S. Cl.
 CPC ............ *G06Q 10/10* (2013.01); *G06F 9/547* (2013.01); *G06F 21/105* (2013.01); *H04L 67/02* (2013.01); *H04L 67/10* (2013.01); *G06Q 2220/00* (2013.01)

(58) Field of Classification Search
 CPC ................... G06Q 10/00–30; G06F 21/00–88
 See application file for complete search history.

(56) References Cited

U.S. PATENT DOCUMENTS

| | | | |
|---|---|---|---|
| 5,553,143 A * | 9/1996 | Ross | G06F 21/10 705/56 |
| 10,013,573 B2 * | 7/2018 | Dillenberger | G06F 16/2379 |
| 2016/0112475 A1 * | 4/2016 | Lawson | H04L 67/02 709/204 |
| 2016/0124742 A1 * | 5/2016 | Rangasamy | G06F 9/5072 717/103 |
| 2017/0005804 A1 * | 1/2017 | Zinder | H04L 9/3247 |
| 2018/0018723 A1 * | 1/2018 | Nagla | H04L 9/3236 |
| 2018/0075527 A1 * | 3/2018 | Nagla | G06Q 40/025 |

OTHER PUBLICATIONS

Ron White, How Computers Work, 7th edition (Year: 2003).*
Satoshi Nakamoto, "Bitcoin: A Peer-to-Peer Electronic Cash System," http://bitcoin.org/bitcoin.pdf, 2008, 9 pages.

* cited by examiner

Primary Examiner — John W Hayes
Assistant Examiner — Taylor S Rak
(74) Attorney, Agent, or Firm — Ryan, Mason & Lewis, LLP

(57) ABSTRACT

A distributed ledger is maintained in accordance with an enterprise. The distributed ledger includes a plurality of nodes such that one or more entities internal to the enterprise and one or more entities external to the enterprise each have access to at least one of the plurality of nodes. Electronic agreements (for example, product/service licenses) between at least a portion of the one or more entities internal to the enterprise and at least a portion of the one or more entities external to the enterprise are managed in association with the distributed ledger. Management includes generating and recording transactions associated with the electronic agreements on the distributed ledger to enable the one or more entities internal to the enterprise and the one or more entities external to the enterprise permissioned access to one or more of the recorded transactions.

20 Claims, 8 Drawing Sheets

| LICENSE TRANSACTION ID ⌐702 | LICENSE TRANSACTION DESCRIPTION ⌐704 | EVENT TYPE ⌐706 | TIME STAMP ⌐708 | PREVIOUS HASH ⌐710 | HASH ⌐712 | NONCE ⌐714 | MERKLE ROOT ⌐716 | CONSENSUS STATUS ⌐718 | VERSION ⌐720 |
|---|---|---|---|---|---|---|---|---|---|
| | | | | | | | | | |
| | | | | | | | | | |
| | | | | | | | | | |

FIG. 8
800

| VENDOR ID ⌐802 | VENDOR NAME ⌐804 | POSTAL CODE ⌐806 | ADDRESS ⌐808 | REGION ⌐810 | COMPANY CODE ⌐812 | SEARCH TERM ⌐814 |
|---|---|---|---|---|---|---|
| | | | | | | |
| | | | | | | |
| | | | | | | |

US 11,397,919 B1

ELECTRONIC AGREEMENT DATA MANAGEMENT ARCHITECTURE WITH BLOCKCHAIN DISTRIBUTED LEDGER

FIELD

The field relates generally to information processing systems, and more particularly to techniques for management of electronic agreement data in such systems.

BACKGROUND

Enterprises such as corporations typically enter into a large number of licensing agreements during the course of business with other corporations, organizations, individuals, and/or entities. Essentially, a licensing agreement or license is an agreement by which one party to the agreement permits another party to the agreement to use some product or service and/or to take some action. By way of example only, a corporation with a variety of strategically aligned businesses may typically purchase licenses for software from software providers (vendors) which are often used to deploy products on premises, e.g., cloud-based licenses such as, but not limited to, Software-as-a-Service (SaaS) licenses.

As a result of such a large number of licenses distributed over multiple organizations within a corporation, many significant challenges are encountered in the management of these licenses.

SUMMARY

Embodiments of the invention provide systems and methods for management of electronic agreement data in information processing systems.

For example, in one embodiment, a method comprises the following steps. A distributed ledger is maintained in accordance with an enterprise. The distributed ledger comprises a plurality of nodes such that one or more entities internal to the enterprise and one or more entities external to the enterprise each have access to at least one of the plurality of nodes. Electronic agreements between at least a portion of the one or more entities internal to the enterprise and at least a portion of the one or more entities external to the enterprise are managed in association with the distributed ledger. Management comprises generating and recording transactions associated with the electronic agreements on the distributed ledger to enable the one or more entities internal to the enterprise and the one or more entities external to the enterprise permissioned access to one or more of the recorded transactions.

In illustrative embodiments, the electronic agreements comprise licenses wherein a given license is associated with at least one of a product and a service provided by a given one of the one or more entities external to the enterprise to allow a given one of the one or more entities internal to the enterprise to use the product and/or service. Further, in illustrative embodiments, the electronic agreements are in the form of electronic (smart) contracts.

Advantageously, in illustrative embodiments, the distributed ledger provides an enterprise with a source of the truth (i.e., an immutable, accurate, complete and trusted record) for all license-related transactions in the system. Smart contracts associated with license creation, modification, and bidding are treated as digital assets, and thus the smart contracts and/or parts thereof are stored as transactions on the distributed ledger. Entities internal to the enterprise are enabled to encrypt their transactions to allow only authorized internal entities to decrypt and access the transaction data.

These and other features and advantages of the invention will become more readily apparent from the accompanying drawings and the following detailed description.

BRIEF DESCRIPTION OF THE DRAWINGS

FIG. 7 illustrates a blockchain license data structure, according to an illustrative embodiment.

FIG. 8 illustrates a blockchain vendor data structure, according to an illustrative embodiment.

DETAILED DESCRIPTION

Figure 1:
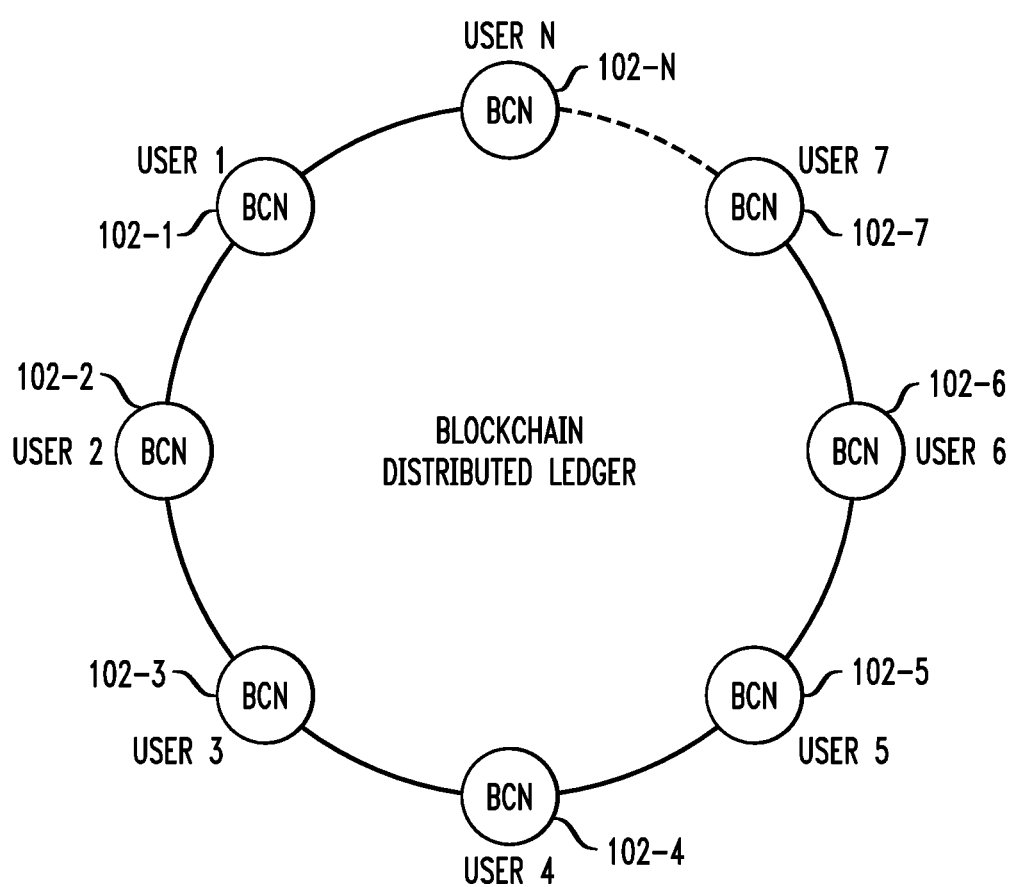
FIG. 1 illustrates a blockchain distributed ledger system, according to an illustrative embodiment.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or an computing system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds).

In many scenarios, as mentioned above, enterprises enter into multiple licensing agreements with such cloud providers and/or other software providers (vendors). As a result of such enterprises having to manage a large number of licenses, significant challenges are encountered.

For example, it is realized that a lack of awareness about an enterprise's organizational licenses results in duplication of process, e.g., such as when a web analytics SaaS license from the same provider is unknowingly purchased by multiple different teams of the same corporation. Thus, different people in different organizations carry out procuring the exact same license.

Further, costs are not optimized across the enterprise. There is currently no effective way to learn which licenses are in use across multiple organizations of the enterprise, and therefore there is no ability to reuse, for example, an existing enterprise license for either the same product or an equivalent.

Still further, enterprises currently lack a single source of truth for all their licenses. The lack of a source of accurate and complete records not only facilitates duplication and increases cost, but it also prohibits technologists from seeing which organizations use which licenses. This stifles collaboration, creativity, and efficiency among teams.

Illustrative embodiments overcome the above and other drawbacks by providing techniques for managing electronic agreement data. While illustrative embodiments are described from the perspective of electronic agreement data associated with licenses, alternative embodiments are applicable to any form of electronic agreement data.

Licensing agreements or licenses, as referred to in accordance with illustrative embodiments described herein, may be negotiated, monitored, and enforced via smart contracts. The term "smart contract" as illustratively used herein is an agreement managed in electronic form by a computer protocol typically (but not necessarily) implemented in a blockchain-based system, that facilitates negotiation and/or verifies performance of a set of requirements or terms of the electronic agreement. However, one or more illustrative embodiments may also apply to agreement data that is associated with a contract (e.g., license) that is not necessarily negotiated and/or enforced as a smart contract, but that is otherwise representable in electronic form that can be managed.

More particularly, illustrative embodiments provide systems and methods for a blockchain distributed ledger and smart contract-based solution for managing product licenses. These systems and methods may be configured to function within both the enterprise's business units and any strategically aligned businesses. As will be further described herein, one or more illustrative embodiments use the blockchain distributed ledger for sharing all licensing-related transactions. The ledger, as will be explained, can be part of a licensing blockchain consensus network. There are multiple participants for the network, all of whom have access to the ledger. Participants may include, but are not limited to, one or more individuals, one or more business units, one or more independent teams, one or more strategically aligned businesses, and one or more vendors (e.g., actual license providers). Furthermore, participants only have access to the licensing information for which they have the permission to view/access.

The licensing ledger also supports smart contracts, according to one or more illustrative embodiments. These contracts are an embedded part of all transactions in the network. This includes, for example, transactions that initiate a licensing request, and/or transactions to update the existing licensing contract. These contracts are accessed/used by the enterprises' participants. The contracts are encrypted and/or protected, which means that vendors do not have the ability to access them. However, in one or more illustrative embodiments, vendors have access to a license bidding contract, which can be used to submit open bids within the licensing ledger.

Before describing illustrative embodiments, details of a blockchain distributed ledger with which one or more embodiments may be implemented will be described in the context of FIG. 1. More particularly, FIG. 1 illustrates a blockchain distributed ledger system 100, according to an illustrative embodiment. As generally illustrated, a plurality of blockchain nodes (BCNs), labeled 102-1, 102-2, 102-3, 102-4, 102-5, 102-6, 102-7, . . . , 102-N, are operatively coupled to form a distributed ledger system. Each BCN has a user associated therewith, i.e., User 1, User 2, User 3, User 4, User 5, User 6, User 7, . . . , User N. More than one user may be associated with a single BCN, and more than one BCN can be associated with a single user.

As used herein, the terms "blockchain," "ledger," "distributed ledger," and "blockchain distributed ledger" may be used interchangeably. As is known, the blockchain distributed ledger protocol is implemented via a distributed, decentralized computer network of compute nodes (e.g., BCNs 102-1, 102-2, 102-3, 102-4, 102-5, 102-6, 102-7, . . . , 102-N). The compute nodes are operatively coupled in a peer-to-peer communications protocol (e.g., as illustratively depicted as system 100 in in FIG. 1). In the computer network, each compute node is configured to maintain a blockchain which is a cryptographically secured record or ledger of data blocks that represent respective transactions within a given computational environment. The blockchain is secured through use of a cryptographic function, e.g., a hash function. A hash function is a cryptographic function which takes an input (or "message") and returns a fixed-size alphanumeric string, which is called the hash value (also a message digest, a digital fingerprint, a digest, or a checksum). Other cryptographic functions can be employed.

Each blockchain is thus a growing list of data records hardened against tampering and revision, and each block typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

In some illustrative embodiments, a blockchain distributed ledger may be a bitcoin implementation wherein the blockchain contains a record, created via the bitcoin protocol, of all previous transactions that have occurred in the bitcoin network. The bitcoin protocol was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

Further, it is to be appreciated that blockchain protocols, bitcoin or otherwise, may form a consensus network whereby a transaction is only added to the blockchain when validated by a consensus of BCNs 102-1, 102-2, 102-3, 102-4, 102-5, 102-6, 102-7, . . . , 102-N. In one example consensus network, each BCN is configured to participate in a consensus protocol as a peer with one peer being designated as a leader. Any peer can assume the role of leader for a given iteration of the consensus protocol. In general, the leader receives transactions from the participating peers in the system and creates a new block for the new transaction. The new block is sent out by the leader node to one or more of the other peer nodes which double check (validate) that the leader computed the new block properly (i.e., the validating nodes agree by consensus). There are other consensus protocols that can be used, and the above-mentioned one is merely an example.

If consensus is reached, then each BCN adds the new block to the blockchain they currently maintain. As a result, after a new transaction is processed by the system 100, each BCN should now have a copy of the same updated blockchain stored in its memory. Then, when a new transaction comes into the system 100, the above-described process of adding the transaction to the blockchain is repeated. It is to be understood that any single BCN may itself serve as the receiver, validator, and block generator for of a new transaction. However, in the context of a consensus protocol, the more BCNs that validate the given transaction, the more trustworthy the data block is considered.

It is to be appreciated that the above descriptions represent illustrative implementations of blockchain and consensus protocols and that embodiments of the invention are not limited to the above or any particular blockchain or consensus protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in illustrative embodiments.

Given the illustrative description of various features of a blockchain distributed ledger, illustrative embodiments of a licensing architecture using smart contracts over a blockchain distributed ledger will now be described in the context of FIGS. 2-9.

Figure 2:
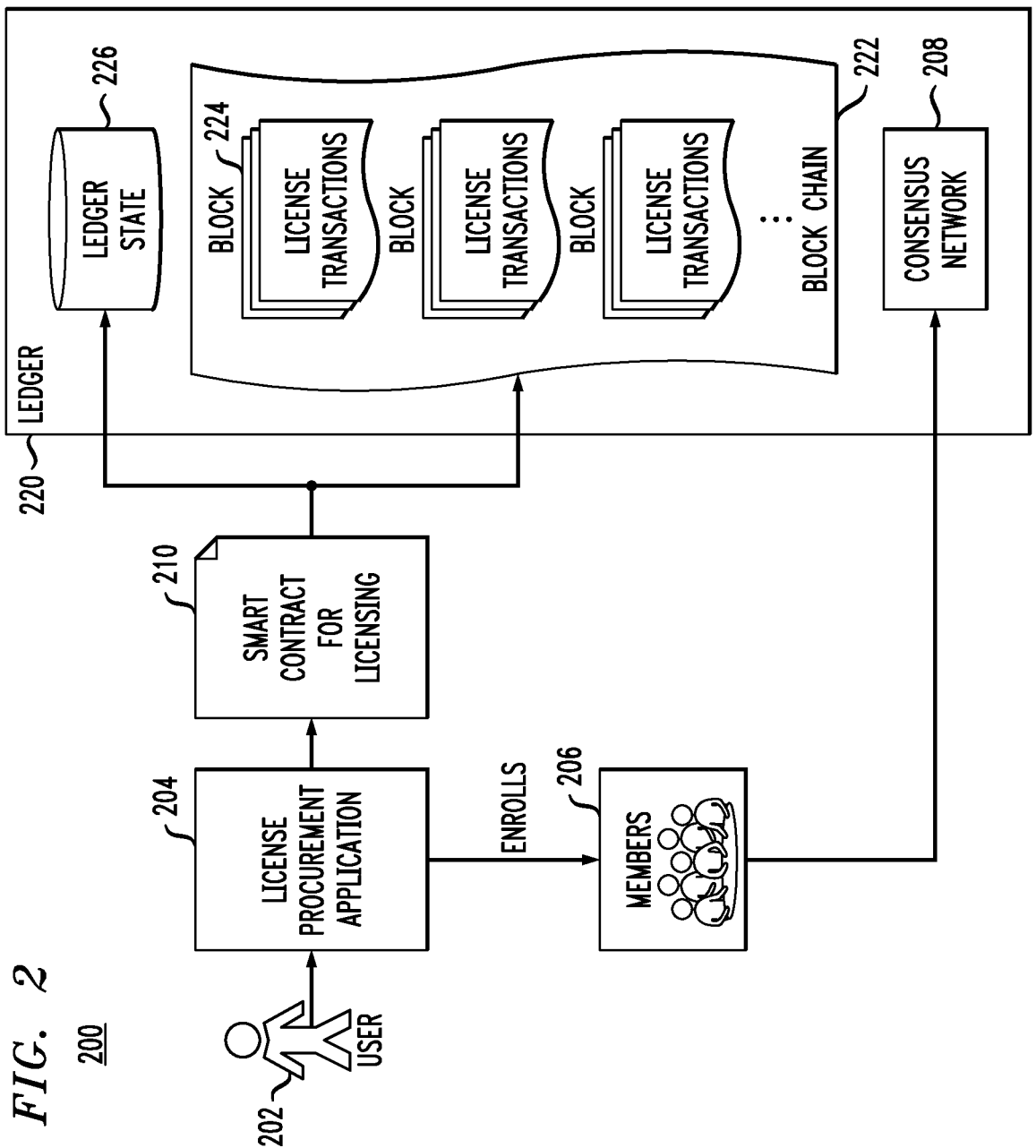
FIG. 2 illustrates a licensing architecture with a blockchain distributed ledger, according to an illustrative embodiment.

FIG. 2 illustrates an environment 200 comprising a licensing architecture with a blockchain distributed ledger, according to an illustrative embodiment. As shown, a user 202 (e.g., one of the users associated with a BCN in FIG. 1) accesses a licensing procurement application program 204. The application 204 requires the user 202 to register as a member of a set of members 206 of a consensus network 208 that is formed by a plurality of BCNs as part of a blockchain distributed ledger 220. As will be explained in further detail below, the application program 204 enables user 202 to create, modify, bid on, or otherwise access a smart contract for licensing 210.

The blockchain distributed ledger 220, as mentioned above, stores validated blocks 222 that include every license transaction 224 that occurred in the past (i.e., for as long as the ledger 220 has been maintained). A ledger state 226 (e.g., metadata about the current state of the ledger) is maintained at each BCN.

It is to be appreciated that the license procurement application program 204 can be implemented at a corresponding BCN associated with the user 202, or at some other compute node in the system. Each BCN in the system can execute program 204.

Given the illustrative licensing architecture with the blockchain distributed ledger shown in FIG. 2, main functionalities will now be described.

The blockchain distributed ledger 220 is configured to allow multiple parties (users) to join the consensus network 208 as a member or participant. In the context of a corporation, participants may include, for example, individuals or organizations within the corporation, as well as third party product or service providers or vendors (e.g., software license providers). Each participant has a private key that uniquely identifies that participant, and which the participant can then use to participate in license-related transactions for which they have permission to participate. Permissions may be established by the administrator of the ledger 220 (e.g., corporate administrator).

Accordingly, when a participant uses any kind of license, such action generates a license transaction 224 that is recorded (once validated by the consensus network 208 of participants) as part of a block onto the chain of blocks 222 that comprises the ledger 220. One or more license transactions 224 are more generally considered "electronic agreement data" that is managed by the licensing architecture with blockchain distributed ledger illustrated in FIG. 2.

In one or more illustrative embodiments, in the context of a corporation, participants internal to the corporation (e.g., organizations within the corporation) encrypt all of their license transactions 224 when interacting within the ledger 220. This allows internal participants to query and decrypt the transactions in the ledger 220. Therefore, in illustrative embodiments, participants that are license providers (i.e., external to the corporation) cannot view the information contained in these encrypted transactions.

Further, when a license transaction 224 is created by invoking a smart contract, the smart contract triggers business logic that reacts to the use of the license. By way of example only, such business logic can include, but is not limited to, invocation of licensing functions (creation, modification, and bidding), and notification of thresholds when license limits are being reached. These notifications and data associated with any licensing functions are transactions that are stored on ledger 220.

Advantageously, the blockchain distributed ledger 220 is a source of truth (i.e., an immutable, accurate, complete and trusted record) for all license-related transactions in the network. Licensing smart contracts as well as bidding smart contracts (as will be further explained below) are treated as digital assets and have associated business rules and contractual conditions for approving such electronic agreements. The smart contracts and/or parts thereof are stored as transactions on the ledger 220. The licensing architecture is configured to support different smart contracts for different strategically aligned businesses. Participants may form peer groups which may include, but are not limited to, business owners, enterprise and business architects, product owners, vendors, etc. Participants in a given peer group may review any applicable new smart licensing requests and any approved transactions. Systematic checks are performed, as well as peer review, to identify any similar existing products and duplicate licenses.

Figure 3:
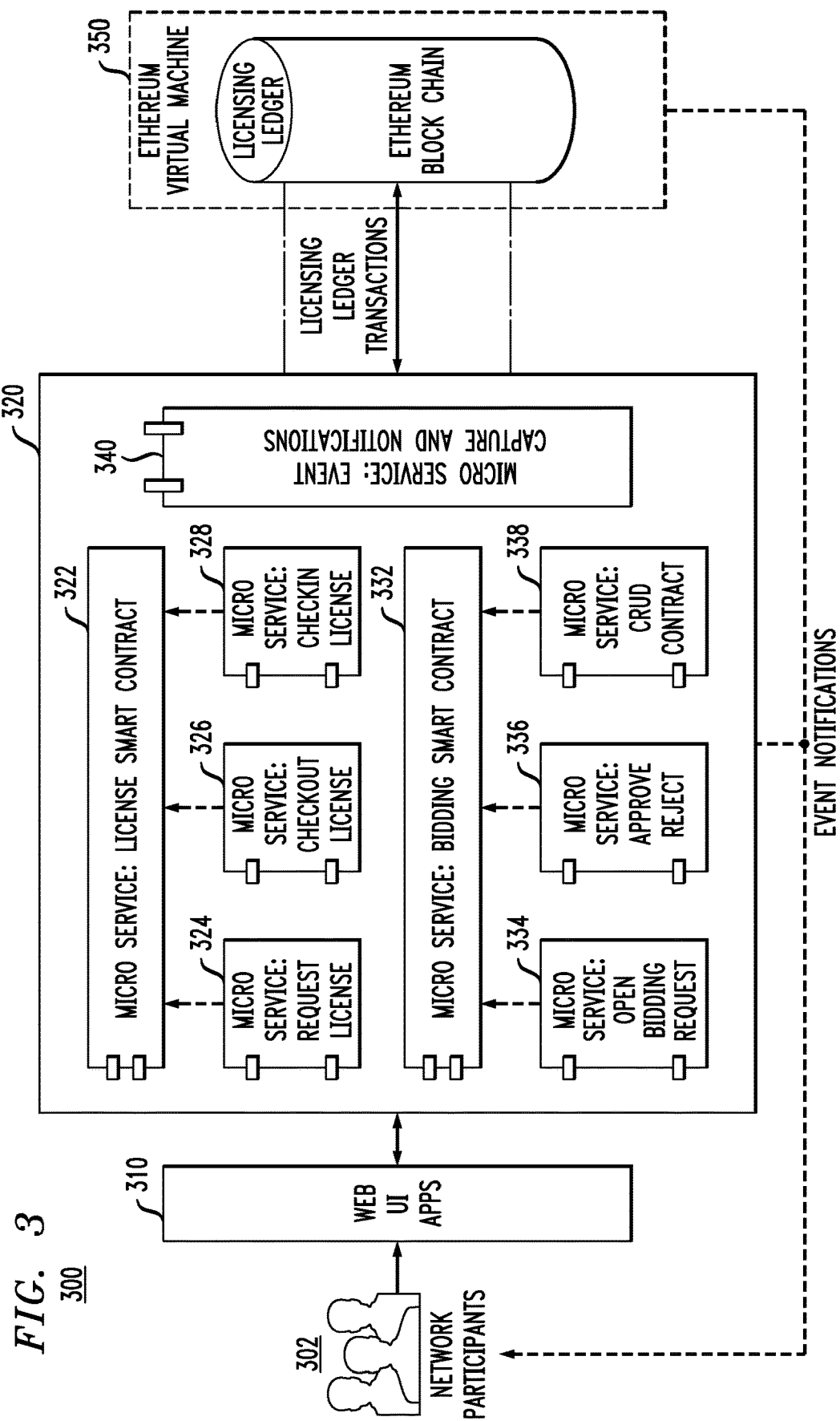
FIG. 3 illustrates further details of a licensing architecture with a blockchain distributed ledger, according to an illustrative embodiment.

FIG. 3 illustrates further details of a licensing architecture with a blockchain distributed ledger, according to an illustrative embodiment. It is to be appreciated that the architecture illustrated in FIG. 3 is implemented at each BCN in the ledger system (e.g., system 100 in FIG. 1).

As shown in environment 300, a licensing architecture with a blockchain distributed ledger with which each participant 302 interfaces (e.g., from a remote or local location through their own client device) comprises a web user interface (UI) 310. Alternatively, the UI 310 can be a non-web interface in an embodiment that is not accessible through public networks. In one illustrative embodiment, the UI 310 is an application that serves as a presentation tier for the participants 302. The UI 310 enables initiating all licensing related transactions, as will be further explained below. A web server that implements the UI 310 may also handle authentication and authorization procedures with respect to the participants 302.

The environment 300 also comprises a smart contract microservice platform 320 operatively coupled to the UI 310. The smart contract microservice platform 320 provides the logic in the form of microservices, in this illustrative embodiment, for all smart contracts and other licensing related operations that are generated and managed for the participants 302.

As shown, a license smart contract microservice 322 is formed from logic comprising a request license microservice 324, a check-out license microservice 326, and a check-in license microservice 328. Further, as shown, a bidding smart contract microservice 332 is formed from logic comprising an open bidding request microservice 334, an approve/reject microservice 336, and a create, read, update, and delete (CRUD) contract microservice 338. The smart contract microservice platform 320 also comprises a micro service event capture and notification module 340 which forms the actual license transactions from the operations performed by the logic of the individual microservices 324, 326, 328, 334, 336, and 338 in the context of the smart contract microservices 322 and 332. The module 340 also provides event notifications to participants 302 as needed. Illustrative processes invoking these microservices will be described below in the context of FIGS. 4-6.

The actual license transactions (captured events) generated by the event capture and notification module 340 are stored on a blockchain distributed ledger 350, as described above. Further, as mentioned, the participants 302 are sent any event notifications from the ledger 350.

In an illustrative embodiment, the microservice platform 320 is implemented in a Cloud Foundry™ Platform-as-a-Service (PaaS) environment that enables Decentralized Applications (DApps). The PaaS and DApp environment hosts the logic of the individual microservices 324, 326, 328, 334, 336, and 338 in the context of the smart contract microservices 322 and 332. Further, the blockchain distributed ledger 350 in the illustrative embodiment is an Ethereum blockchain that is instantiated on one or more virtual machines (VMs). Advantageously, a decentralized licensing platform, such as shown in FIG. 3, manages a licensing smart contract, immutably stores all the licensing assets and related data as transactions, and enables licensing smart contract transactions to be encrypted as explained above.

Figure 4:
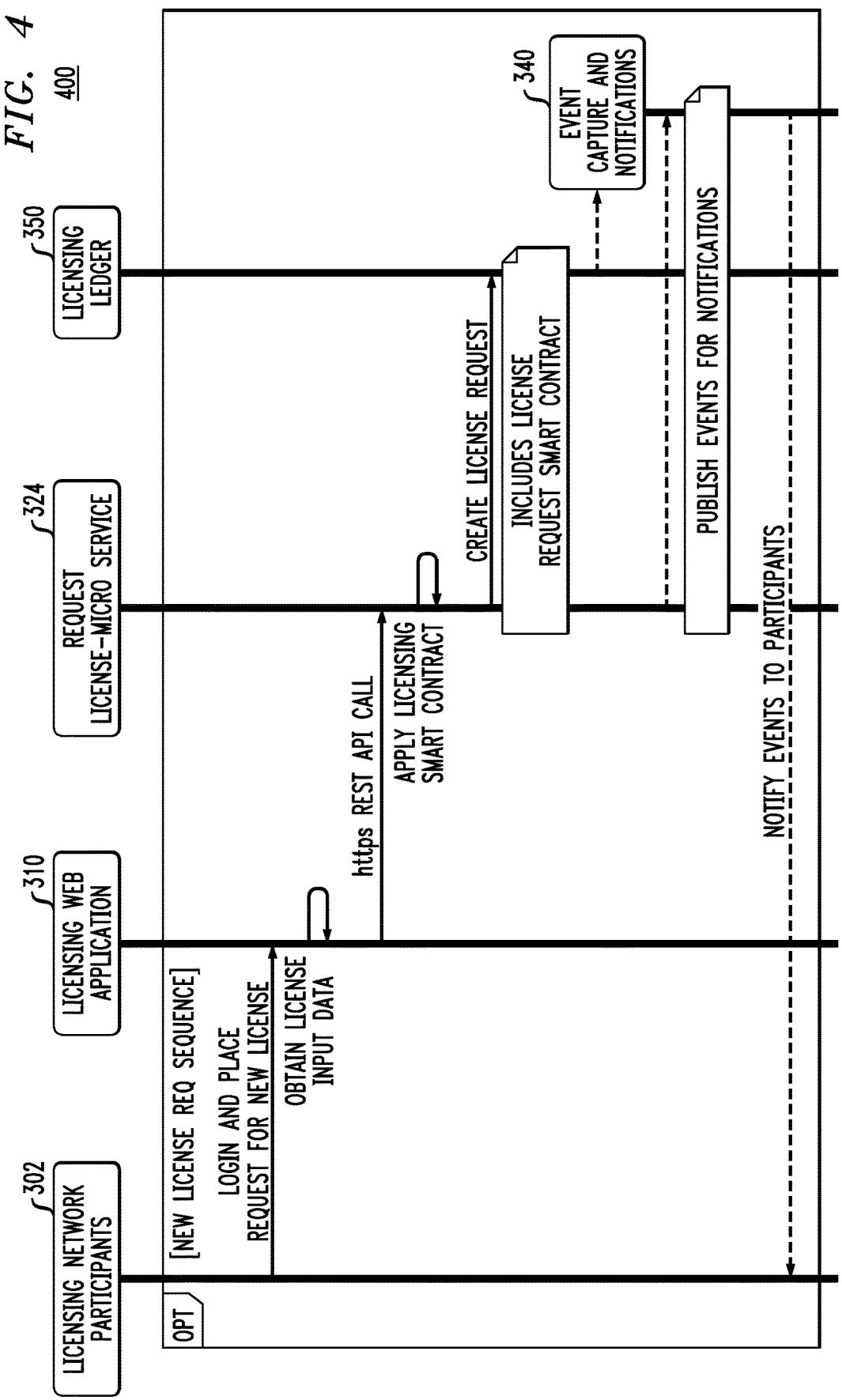
FIG. 4 illustrates a blockchain license request process, according to an illustrative embodiment.
Figure 5:
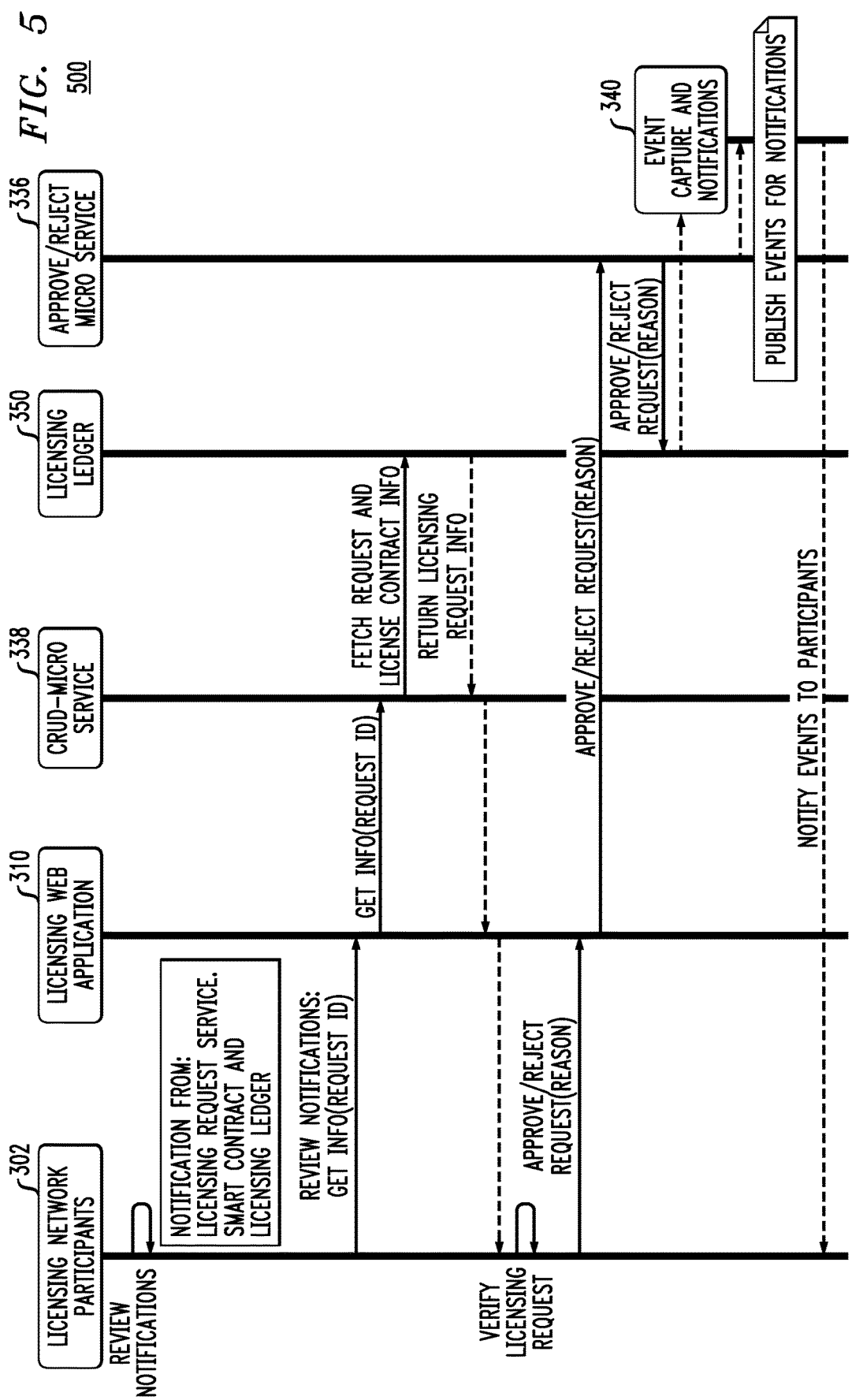
FIG. 5 illustrates a blockchain consensus/mining process, according to an illustrative embodiment.

In one illustrative use case, in the context of components of the architecture of environment 300 in FIG. 3, a license creation request process is shown in FIG. 4 and a requested license approval/rejection process is shown in FIG. 5. That is, one or more participants 302 use the licensing architecture to request a license and one or more other participants 302 use the architecture to approve or reject a requested license. Recall that a participant (user) interacts with these processes via one or more corresponding BCNs directly or through a client device.

FIG. 4 illustrates a blockchain license request process 400, according to an illustrative embodiment. More particularly, as shown, one or more participants 302 login and place a request for a new license. The web UI 310 obtains the relevant license input data from the participants or some other source, and then sends an HTTPS REST API Call to the request license microservice 324. HTTPS refers to the Secure Hyper Text Transfer Protocol, REST refers to a Representational State Transfer protocol, and API refers to an Application Programming Interface. The microservice 324 creates a licensing smart contract and sends the smart contract along with a create license request (with a unique request identifier or ID) to the licensing ledger 350 for storage. Module 340 sends out any appropriate notifications to the one or more participants 302.

FIG. 5 illustrates a blockchain consensus/mining process 500, according to an illustrative embodiment. More particularly, as shown, one or more participants 302 review any notifications for a given requested licensing smart contract and then use the request ID to obtain (mine) transaction data for the given smart contract. This information request process traverses the web UI 310, the CRUD contract microservice 338, and the ledger 350. More specifically, the CRUD contract microservice 338 mines the ledger for relevant transaction data. Given the transaction data associated with the requested license obtained from the ledger 350, the approve/reject microservice 336 is used by the participant to reject or approve the requested license. Module 340 then sends out any appropriate notifications to the one or more participants 302. This mining process 500 can be performed by multiple participants to reach a consensus.

Figure 6:
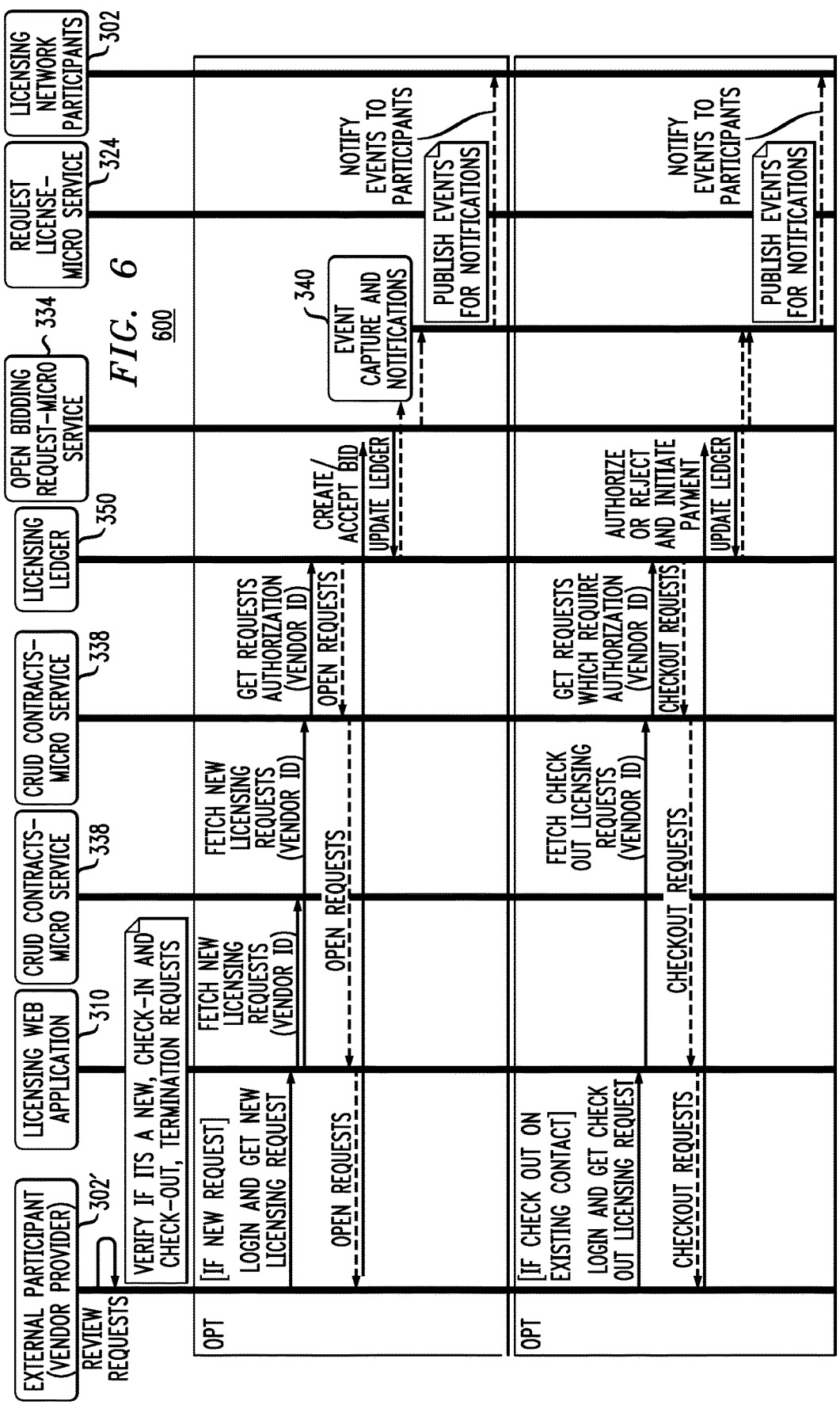
FIG. 6 illustrates a blockchain license bidding process, according to an illustrative embodiment.

Turning now to FIG. 6, a blockchain license bidding process 600, according to an illustrative embodiment, is shown. This is an example wherein one participant (such as, for example, a vendor) submits a license bid to another participant (such as, for example, an enterprise that may use a vendor product or service subject to the license). In this example, the vendor (one or more external participants) is denoted as 302' while the enterprise (one or more internal participants) is denoted as 302.

The top portion of process 600 illustrates bidding associated with a new request wherein the vendor is reviewing a license request associated with a new smart contract, while the bottom portion of process 600 (check-out process) illustrates bidding with respect to approval/rejection of additional licenses for an existing smart contract. The check-out is implemented in accordance with the check-out microservice 326 (not expressly shown in process 600), while a check-in process is implemented by the check-in microservice 328 (not part of this example process). Check-out and check-in refer to the respective operations of obtaining a smart contract from the ledger 350 and returning a smart contract to the ledger 350.

In either case, the vendor invokes the CRUD contract microservice 338 via the web UI 310 to obtain transaction data associated with either the new contract or the existing contract from the ledger 350. Again, in both cases, the vendor uses the open bidding request microservice 334 to accept or reject the new license smart contract request or the additional licenses for an existing contract (and can request initiation of payment). The ledger 350 is updated with all the transaction data generated during these operations, and notifications are provided via module 340 to the appropriate participants (i.e., enterprise 302 and/or vendor 302') and other microservices (e.g., request license microservice 324) as needed.

Again, it is to be understood that the processes described above in FIGS. 4-6 are intended to be illustrative in nature, and thus alternative embodiments are not limited to the sequence of steps/operations or microservices shown therein.

For example, the smart contract microservice platform 320 may also comprise one or more microservices that provide logic that ensures that, while any contract is available for bidding, any accepted contract must be available for enterprise members to review. Further, one or more microservices can provide logic that enables legal or subject matter experts to highlight and/or create sections within a smart contract or extra portions of a license for the purposes of further or future analysis. Still further, event capture and notification module 340 of the platform 320 may be further configured to notify participants about key events such as, but not limited to, an approaching contract expiration date, review new contracts, bidding start/end dates, marked license modifications, etc.

FIG. 7 illustrates a blockchain license data structure 700, according to an illustrative embodiment. That is, data structure 700 represents an example of a license transaction (electronic agreement data) associated with a particular smart contract that can be stored on the blockchain distributed ledger. In the example, the structure 700 comprises a license transaction identifier (ID) 702, a licensing transaction description 704, an event type 706, a time stamp 708, a previous hash 710, a hash 712, a nonce 714, a Merkle root 716, a consensus status 718, and a version 720. It should be understood that use of any particular hash, nonce, and/or Merkle root depends on the cryptographic method used to process the transaction data. The version may refer to the version of the smart contract associated with the given transaction ID. Alternative data structures with more, less, or different fields may be employed in alternative embodiments.

FIG. 8 illustrates a blockchain vendor data structure, according to an illustrative embodiment. That is, data structure 800 represents an example of a license transaction (electronic agreement data) associated with a particular vendor that can be stored on the blockchain distributed ledger. In the example, the structure 800 comprises a vendor identifier (ID) 802, a vendor name 804, a vendor postal code 806, a vendor address 808, a vendor geographic region 810, a vendor company code 812, and search terms 814 associated with the vendor. Alternative data structures with more, less, or different fields may be employed in alternative embodiments.

It is to be understood that the data structures in FIGS. 7 and 8 are for illustrative purposes only, and that transaction data stored on the ledger can be in any form appropriate for the given application.

At least portions of the system for managing electronic agreement data shown in FIGS. 1-8 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 9.

As is apparent from the above, one or more of the processing modules or other components of the system for managing electronic agreement data shown in FIGS. 1-8 may each run on a computer, server, storage device or other processing platform element. A given such element may be viewed as an example of what is more generally referred to herein as a "processing device." An example of such a processing platform is processing platform 900 shown in FIG. 9.

The processing platform 900 in this embodiment comprises a plurality of processing devices, denoted 902-1, 902-2, 902-3, . . . 902-N, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 9:
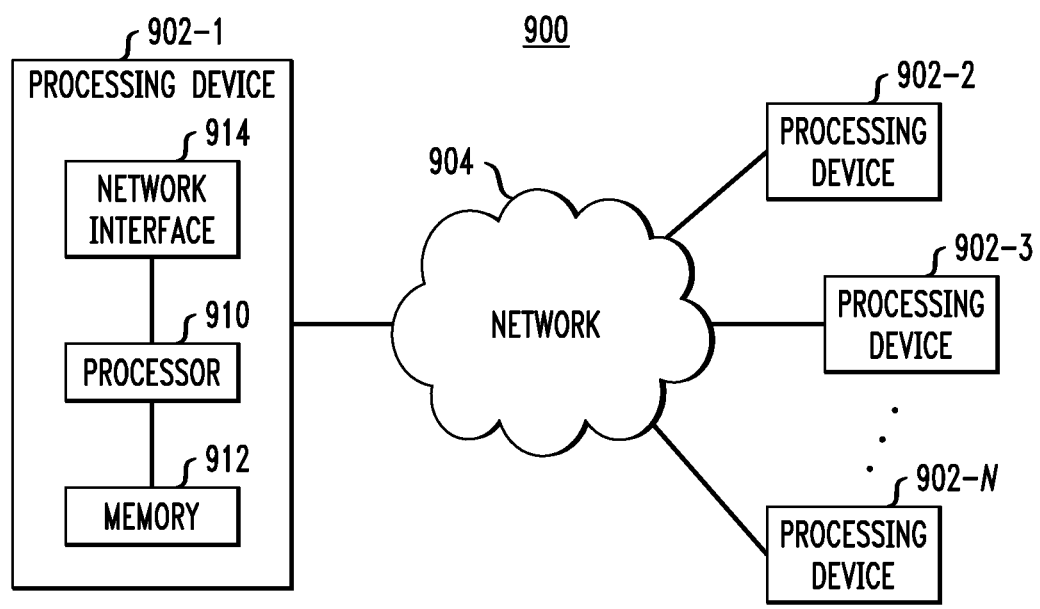
FIG. 9 illustrates a processing platform used to implement a system for managing electronic agreement data, according to an illustrative embodiment.

Also included in the processing device 902-1 of the example embodiment of FIG. 9 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for managing electronic agreement data, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for managing electronic agreement data. Such components can communicate with other elements of the system over any type of network or other communication media.

As indicated previously, in some embodiments, components of the system for managing electronic agreement data as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:

maintaining a distributed ledger in accordance with an enterprise, wherein the distributed ledger comprises a plurality of ledger nodes, the plurality of ledger nodes comprising a first set of ledger nodes associated with one or more entities of the enterprise and a second set of ledger nodes associated with one or more third party entities; and managing, via the distributed ledger, negotiation of an electronic agreement between at least a portion of the first set of ledger nodes and at least a portion of the second set of ledger nodes, wherein managing further comprises:

provisioning a set of electronic agreement microservices accessible via the distributed ledger, the set of electronic agreement microservices comprises:

a first subset of electronic agreement microservices, accessible by the first set of ledger nodes, for requesting one or more licenses associated with at least one of one or more products and one or more services provided by the one or more third party entities;

a second subset of electronic agreement microservices, accessible by the second set of ledger nodes associated with the one or more third party entities, for bidding on license requests by the one or more entities of the enterprise for the one or more licenses associated with said at least one of the one or more products and the one or more services provided by the one or more third party entities; and a third subset of electronic agreement microservices, accessible by both the first set of ledger nodes and the second set of ledger nodes, for providing event notifications related to negotiation of the electronic agreement;

recording transactions associated with the electronic agreement on the distributed ledger received from the set of electronic agreement microservices, wherein each of the transactions is generated by at least one of: one or more of the first set of ledger nodes; and one or more of the second set of ledger nodes; and controlling access to at least a portion of the transactions generated by the first set of ledger nodes by encrypting at least a portion of the transactions generated by the first set of ledger nodes to prevent access by the second set of ledger nodes to the encrypted portion of the transactions generated by the first set of ledger nodes; and wherein the steps are performed by one or more processing devices each comprising a processor coupled to a memory executing program code.

2. The method of claim 1, further comprising utilizing the first and second subsets of the set of electronic agreement microservices to generate at least one licensing transaction for a given one of the one or more licenses which is associated with at least a given one of one or more products and one or more services provided by a given one of the one or more third party entities, and further comprising utilizing the third subset of the set of electronic agreement microservices to generate an event notification allowing a given one of the one or more entities of the enterprise to use at least the given one of the one or more products and the one or more services.

3. The method of claim 1, further comprising utilizing the set of electronic agreement microservices to generate one or more transactions enabling at least one of create, modify, retrieve, and return of a given smart contract to be recorded or already recorded in the distributed ledger by utilizing logic associated with one or more electronic contract functions.

4. The method of claim 1, further comprising utilizing the second subset of the set of electronic agreement microservices to generate one or more transactions enabling at least a given one of the one or more third party entities to bid on a license request by utilizing logic associated with one or more electronic contract functions.

5. The method of claim 1, wherein managing further comprises performing a check for duplicate electronic agreements recorded on the distributed ledger.

6. The method of claim 1, wherein managing further comprises providing a user interface for accessing the set of electronic agreement microservices.

7. The method of claim 1, further comprising utilizing the third subset of the set of electronic agreement microservices to send one or more notifications of events related to one or more of the transactions recorded on the distributed ledger to at least a given one of the one or more entities of the enterprise and at least a given one of the one or more third party entities.

8. The method of claim 1, wherein the distributed ledger is a blockchain distributed ledger.

9. The method of claim 1, comprising representing a given transaction recorded on the distributed ledger with a data structure comprising a set of fields specifying metadata about the given transaction comprising one or more of a transaction identifier, a transaction description, an event type, a time stamp, a cryptographic function, a consensus protocol status, and a version identifier.

10. The method of claim 1, comprising representing a given transaction recorded on the distributed ledger with a data structure comprising a set of fields specifying metadata about a given one of the one or more third party entities comprising one or more of a third party entity identifier, a third party entity name, address data, a company identifier, and search criteria associated with the given third party entity.

11. An article of manufacture comprising a non-transitory processor-readable storage medium having stored therein program code of one or more software programs, wherein the program code when executed by at least one processing device causes said at least one processing device to perform the steps of:

maintaining a distributed ledger in accordance with an enterprise, wherein the distributed ledger comprises a plurality of ledger nodes, the plurality of ledger nodes comprising a first set of ledger nodes associated with one or more entities of the enterprise and a second set of ledger nodes associated with one or more third party entities; and managing, via the distributed ledger, negotiation of an electronic agreement between at least a portion of the first set of ledger nodes and at least a portion of the second set of ledger nodes, wherein managing further comprises:

provisioning a set of electronic agreement microservices accessible via the distributed ledger, the set of electronic agreement microservices comprises:

a first subset of electronic agreement microservices, accessible by the first set of ledger nodes, for requesting one or more licenses associated with at least one of one or more products and one or more services provided by the one or more third party entities;

a second subset of electronic agreement microservices, accessible by the second set of ledger nodes associated with the one or more third party entities, for bidding on license requests by the one or more entities of the enterprise for the one or more licenses associated with said at least one of the one or more products and the one or more services provided by the one or more third party entities; and a third subset of electronic agreement microservices, accessible by both the first set of ledger nodes and the second set of ledger nodes, for providing event notifications related to negotiation of the electronic agreement;

recording transactions associated with the electronic agreement on the distributed ledger received from the set of electronic agreement microservices, wherein each of the transactions is generated by at least one of: one or more of the first set of ledger nodes; and one or more of the second set of ledger nodes; and controlling access to at least a portion of the transactions generated by the first set of ledger nodes by encrypting at least a portion of the transactions generated by the first set of ledger nodes to prevent access by the second set of ledger nodes to the encrypted portion of the transactions generated by the first set of ledger nodes.

12. The article of manufacture of claim 11, wherein the program code when executed by said at least one processing device further causes said at least one processing device to perform the step of utilizing the set of electronic agreement microservices to generate one or more transactions enabling at least one of create, modify, retrieve, and return of a given smart contract to be recorded or already recorded in the distributed ledger by utilizing logic associated with one or more electronic contract functions.

13. The article of manufacture of claim 11, wherein the program code when executed by said at least one processing device further causes said at least one processing device to perform the step of utilizing the second subset of the set of electronic agreement microservices to generate one or more transactions enabling at least a given one of the one or more third party entities to bid on a license request by utilizing logic associated with one or more electronic contract functions.

14. A system comprising:
one or more processing devices including a plurality of processors operatively coupled to one or more memories and in communication via a network configured for:
maintaining a distributed ledger in accordance with an enterprise, wherein the distributed ledger comprises a plurality of ledger nodes, the plurality of ledger nodes comprising a first set of ledger nodes associated with one or more entities of the enterprise and a second set of ledger nodes associated with one or more third party entities; and
managing, via the distributed ledger, negotiation of an electronic agreement between at least a portion of the first set of ledger nodes and at least a portion of the second set of ledger nodes, wherein managing further comprises:
provisioning a set of electronic agreement microservices accessible via the distributed ledger, the set of electronic agreement microservices comprises:
a first subset of electronic agreement microservices, accessible by the first set of ledger nodes, for requesting one or more licenses associated with at least one of one or more products and one or more services provided by the one or more third party entities;
a second subset of electronic agreement microservices, accessible by the second set of ledger nodes associated with the one or more third party entities, for bidding on license requests by the one or more entities of the enterprise for the one or more licenses associated with said at least one of the one or more products and the one or more services provided by the one or more third party entities; and
a third subset of electronic agreement microservices, accessible by both the first set of ledger nodes and the second set of ledger nodes, for providing event notifications related to negotiation of the electronic agreement;
recording transactions associated with the electronic agreement on the distributed ledger received from the set of electronic agreement microservices, wherein each of the transactions is generated by at least one of: one or more of the first set of ledger nodes; and one or more of the second set of ledger nodes; and
controlling access to at least a portion of the transactions generated by the first set of ledger nodes by encrypting at least a portion of the transactions generated by the first set of ledger nodes to prevent access by the second set of ledger nodes to the encrypted portion of the transactions generated by the first set of ledger nodes.

15. The system of claim 14, wherein the one or more processing devices are further configured for utilizing the set of electronic agreement microservices to generate one or more transactions enabling at least one of create, modify, retrieve, and return of a given smart contract to be recorded or already recorded in the distributed ledger by utilizing logic associated with one or more electronic contract functions.

16. The system of claim 14, wherein the one or more processing devices are further configured for utilizing the second subset of the set of electronic agreement microservices to generate one or more transactions enabling at least a given one of the one or more third party entities to bid on a license request by utilizing logic associated with one or more electronic contract functions.

17. The system of claim 14, wherein managing further comprises performing a check for duplicate smart contracts recorded on the distributed ledger.

18. The system of claim 14, wherein managing further comprises providing a user interface for accessing the set of electronic agreement microservices.

19. The system of claim 14, wherein the one or more processing devices are further configured for utilizing the third subset of the set of electronic agreement microservices to send one or more notifications of events related to one or more of the transactions recorded on the distributed ledger to at least a given one of the one or more entities of the enterprise and at least a given one of the one or more third party entities.

20. The system of claim 14, wherein the distributed ledger is a blockchain distributed ledger.

* * * * *